United States Patent
Maeda et al.

(10) Patent No.: US 7,497,609 B2
(45) Date of Patent: Mar. 3, 2009

(54) ILLUMINATING DEVICE AND LIQUID CRYSTAL DISPLAY APPARATUS

(75) Inventors: Satoshi Maeda, Kawasaki (JP); Hirokazu Aritake, Kawasaki (JP)

(73) Assignees: Fujitsu Limited, Kawasaki (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/064,461

(22) Filed: Feb. 23, 2005

(65) Prior Publication Data

US 2005/0140835 A1     Jun. 30, 2005

Related U.S. Application Data

(63) Continuation of application No. PCT/JP02/12564, filed on Nov. 29, 2002.

(51) Int. Cl.
*F21V 7/04* (2006.01)

(52) U.S. Cl. ............... 362/616; 362/330; 362/561; 362/609

(58) Field of Classification Search ........ 362/616, 362/626, 27, 560, 561, 511, 330, 606, 607, 362/609
See application file for complete search history.

(56) References Cited

U.S. PATENT DOCUMENTS

| | | | | |
|---|---|---|---|---|
| 4,011,001 A | * | 3/1977 | Moriya | 349/65 |
| 4,648,690 A | * | 3/1987 | Ohe | 362/600 |
| 4,777,480 A | * | 10/1988 | Okamoto et al. | 340/688 |
| 4,870,484 A | * | 9/1989 | Sonehara | 348/791 |
| 5,664,862 A | | 9/1997 | Redmond et al. | |
| 5,894,539 A | | 4/1999 | Epstein | |
| 6,161,939 A | * | 12/2000 | Bansbach | 362/223 |
| 6,280,044 B1 | * | 8/2001 | Kusakabe | 362/610 |
| 6,283,602 B1 | | 9/2001 | Kawaguchi et al. | |
| 6,293,683 B1 | | 9/2001 | Okada | |
| 6,443,584 B2 | * | 9/2002 | Suzuki et al. | 362/633 |
| 6,456,279 B1 | * | 9/2002 | Kubo et al. | 345/173 |
| 6,461,007 B1 | * | 10/2002 | Akaoka | 362/610 |
| 6,530,669 B2 | * | 3/2003 | Toyoda | 362/610 |
| 6,561,660 B2 | * | 5/2003 | Huang | 362/27 |
| 6,616,289 B2 | * | 9/2003 | Umemoto et al. | 362/600 |
| 6,752,506 B2 | * | 6/2004 | Suzuki et al. | 362/610 |

(Continued)

FOREIGN PATENT DOCUMENTS

EP        0 560 605 A1     9/1993

(Continued)

*Primary Examiner*—Sandra L. O'Shea
*Assistant Examiner*—Gunyoung T. Lee
(74) *Attorney, Agent, or Firm*—Greer, Burns & Crain, Ltd.

(57) ABSTRACT

An illuminating device comprises a pair of light sources and a rod-like photoconductor. The rod-like photoconductor includes a pair of planes of incidence entered by the light from the light sources, a reflection surface having a plurality of prisms and an exit plane located opposite to the reflection surface. The width between the reflection surface and the exit plane at the planes of incidence of the rod-like photoconductor is smaller than the width of the light sources in the same direction. As a result, the brightness distribution of the light exiting from the rod-like photoconductor becomes uniform. The illuminating device is combined with a plate-like photoconductor to make up a planar illuminating device. Also, the illuminating device is combined with a liquid crystal panel to make up a liquid crystal display apparatus.

24 Claims, 7 Drawing Sheets

U.S. PATENT DOCUMENTS

| | | | |
|---|---|---|---|
| 6,883,924 B2 * | 4/2005 | Maeda et al. | 362/612 |
| 7,077,557 B2 * | 7/2006 | Liu | 362/629 |
| 2001/0017773 A1 | 8/2001 | Suzuki et al. | |

FOREIGN PATENT DOCUMENTS

| | | |
|---|---|---|
| EP | 0 866 264 | 9/1998 |
| EP | 0 969 311 | 1/2000 |
| JP | 59-226303 | 12/1984 |
| JP | 8-220346 | 8/1996 |
| JP | 10-260405 | 9/1998 |
| JP | 2000-164019 | 6/2000 |
| JP | 2001-035227 | 2/2001 |
| JP | 2001-236810 | 8/2001 |
| JP | 2002-133936 | 5/2002 |
| JP | 2002-216527 | 8/2002 |
| JP | 2002-260429 | 9/2002 |

* cited by examiner

POSITION OF ROD-LIKE PHOTOCONDUCTOR

POSITION OF LED LIGHT SOURCE

POSITION OF ROD-LIKE PHOTOCONDUCTOR

THICKNESS t OF ROD-LIKE PHOTOCONDUCTOR

POSITION OF ROD-LIKE PHOTOCONDUCTOR

ILLUMINATING DEVICE AND LIQUID CRYSTAL DISPLAY APPARATUS

CROSS-REFERENCE TO RELATED APPLICATION

This application is a continuation application and is based upon PCT/JP02/12564, filed on Nov. 29, 2002.

TECHNICAL FIELD

The present invention relates to an illuminating device and a liquid crystal apparatus including the illuminating device.

BACKGROUND OF ART

The liquid crystal display apparatus is thin and light in weight, and therefore finds wide applications as a display of a portable information terminal. The liquid crystal display apparatus comprises a liquid crystal panel including a pair of substrates between which the liquid crystal is held. The apparatus may further comprise a color filter or a polarizer. The apparatus is of two types, a transmission-type display apparatus in which light is transmitted through the substrate pair and the liquid crystal, and a reflection-type display apparatus in which light is transmitted through one of the substrates and the liquid crystal and reflected on the other substrate. In both types of liquid crystal display apparatus, the phase is modulated when light is transmitted through the liquid crystal. Black and white are displayed by the light transmitted through the color filter and transmitted or shielded by the polarizer. The arrangement of a plurality of dots forms character information or image information.

The liquid crystal itself is a light-receiving element incapable of emitting light, and the information is difficult to recognize visually with the liquid crystal alone. Generally, therefore, an illuminating device is combined with the liquid crystal panel. In the transmission-type liquid crystal display apparatus, the illuminating device is arranged on the back of the liquid crystal panel, while the illuminating device is arranged on the front of the liquid crystal panel in the reflection-type liquid crystal display apparatus. In the reflection-type liquid crystal panel, the illuminating device is not required, as long as sunlight or the light from a room lamp is radiated on the liquid crystal panel. In an environment hardly reached by light, however, the reflection-type liquid crystal panel, like the transmission-type liquid crystal panel, requires the illuminating device.

A conventional linear illuminating device is available which comprises a light source and a rod-like photoconductor entered by the light from the light source through a plane of incidence and emitting the light by way of a long exit plane. A conventional planar illuminating device is also available which comprises a light source, a rod-like photoconductor and a plate-like photoconductor entered by the light from the rod-like photoconductor through a plane of incidence and emitting the light through a wide exit plane (Japanese Unexamined Patent Publication No. 10-260405).

In recent years, demand has increased for an improved display quality including the color display, high brightness and high resolution of the liquid crystal display apparatuses used for information terminals. In particular, uniform distribution of brightness in a plane has come to be in strong demand. However, in view of the fact that the light having a wide angular distribution from a light source enters a rod-like photoconductor, the strength distribution of the light emitted from the exit plane of the rod-like photoconductor is not uniform, and the brightness tends to decrease in the neighborhood of the end portions of the exit plane of the rod-like photoconductor.

DISCLOSURE OF INVENTION

The object of this invention is to provide an illuminating device having a brightness distribution of the exit light of the rod-like photoconductor as uniform as possible to secure a uniform brightness distribution and an inexpensive liquid crystal display apparatus of high display quality.

According to one aspect of the invention, there is provided an illuminating device comprising a light source and a rod-like photoconductor including a plane of incidence entered by the light from the light sources, a reflection surface having a plurality of prisms and an exit plane far from the reflection surface, and wherein the width between the reflection surface and the exit plane at the plane of incidence of the rod-like photoconductor is smaller than the width of the light sources in the same direction.

According to another aspect of the invention, there is provided an illuminating device comprising a light source, a rod-like photoconductor and a plate-like photoconductor, wherein the rod-like photoconductor includes a plane of incidence entered by the light from the light source, a reflection surface having a plurality of prisms and an exit plane opposite to the reflection surface, wherein the plate-like photoconductor includes a plane of incidence entered by the light from the exit plane of the rod-like photoconductor and an exit plane, and wherein the width between the reflection surface and the exit plane at the plane of incidence of the rod-like photoconductor is smaller than the width of the light source in the same direction.

With this configuration, the angular distribution of the light entering the plane of incidence of the rod-like photoconductor is improved and the dark portion in the neighborhood of the end portions of the rod-like photoconductor is eliminated, so that the brightness distribution of the rod-like photoconductor becomes uniform, thereby making it possible to provide an illuminating device having a uniform brightness distribution.

According to still another aspect of the invention, there is provided a liquid crystal display apparatus comprising the illuminating device described above and a liquid crystal panel. This liquid crystal display apparatus has a uniform brightness distribution and can be fabricated inexpensively with high display quality.

BEST MODE FOR CARRYING OUT THE INVENTION

An embodiment of the invention is explained below with reference to the drawings.

Figure 1:
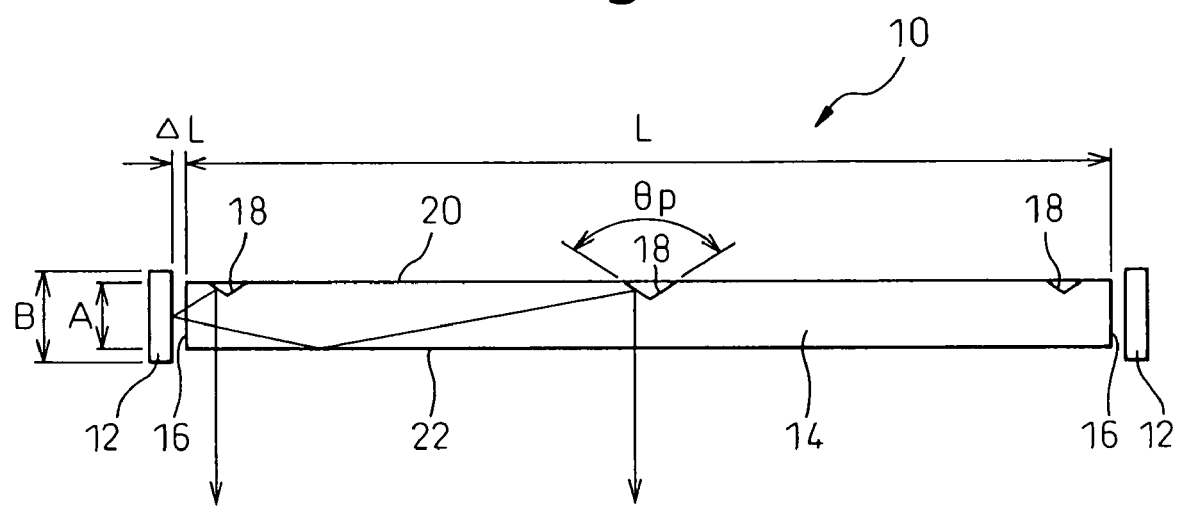
FIG. 1 is a diagram showing an illuminating device according to an embodiment of the invention.

FIG. 1 is a diagram showing an illuminating device (linear light source) according to an embodiment of the invention. A illuminating device 10 comprises a pair of light sources 12 formed of an LED and a rod-like photoconductor 14. The two LED light sources are arranged on either side of the rod-like photoconductor 14. The rod-like photoconductor 14 includes a pair of planes of incidence (end surfaces) 16 entered by the light from the light sources 12, a reflection surface (upper surface) 20 having a plurality of prisms 18 and an exit plane (lower surface) 22 opposite to the reflection surface 20. A multiplicity of prisms 18, though only three are shown in FIG. 1, are arranged continuously along the reflection surface 20.

The width (perpendicular to the exit plane 22) between the reflection surface 20 and the exit plane 22 on the planes of incidence 16 of the rod-like photoconductor 14 is designated by A, and the width of the light sources 12 in the same direction by B. The width A of the planes of incidence 16 is smaller than the width B of the light sources 12. In other words, the width B of the light sources 12 is larger than the width A of the planes of incidence 16. The width of the rod-like photoconductor 14 is constant along the length thereof, and the width of the central portion is equal to the width A of the planes of incidence 16. The length of the rod-like photoconductor 14 is designated by L, and the gap between each light source 12 and the rod-like photoconductor 14 is designated by ΔL. The apical angle of the prism 18 is designated by θp. According to this embodiment, all the prisms 18 have the same apical angle θp.

While the illuminating device 10 is in operation, the light emitted from the light sources 12 enters the planes of incidence 16 of the rod-like photoconductor 14. Part of the light that has entered the rod-like photoconductor 14 is reflected on the surface of the prisms 18 of the reflection surface 20 and exits from the exit plane 22. The other part of the light that has entered the rod-like photoconductor 14 is reflected on the exit plane 22 and then is further reflected on the reflection surface 20, leaves the exit plane 22.

Figure 2:
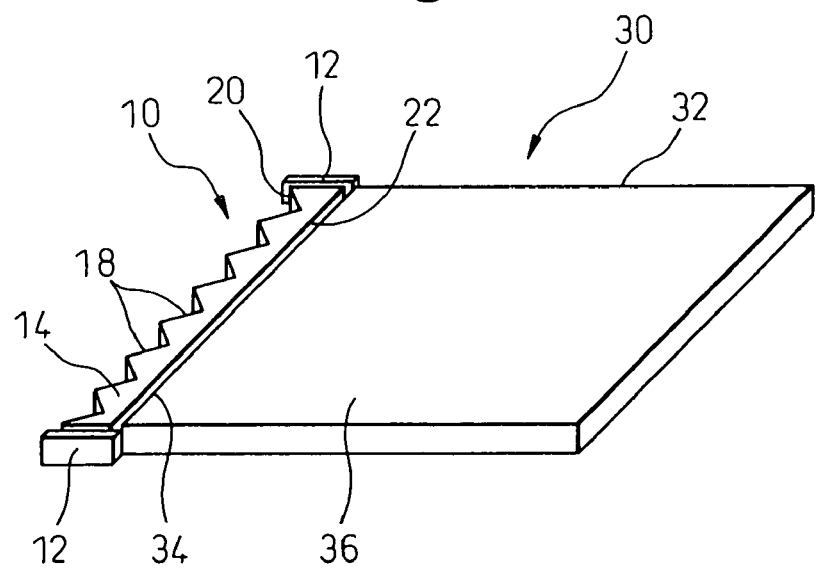
FIG. 2 is a diagram showing an illuminating device according to an embodiment of the invention.

FIG. 2 is a diagram showing the illuminating device (planar light source) according to an embodiment of the invention. The illuminating device 30 comprises a pair of LED light sources 12, a rod-like photoconductor 14 and a plate-like photoconductor 32. The LED light sources 12 and the rod-like photoconductor 14 have a similar configuration to those of the illuminating device 10 shown in FIG. 1. Specifically, the rod-like photoconductor 14 includes a pair of planes of incidence 16 entered by the light from the LED light sources 12, a reflection surface 20 having a plurality of prisms 18 and an exit plane 22 located opposite to the reflection surface 20. The width A between the reflection surface 20 on each plane of incidence 16 and the exit plane 22 of the rod-like photoconductor 14 is smaller than the width B of the light sources 12 in the same direction. Nevertheless, the configuration of the illuminating device 30 is not limited to that of the illuminating device 10 shown in FIG. 1, but may be used in combination with a modification of the illuminating device 10 described later.

The plate-like photoconductor 32 includes a plane of incidence (end surface) 34 entered by the light from the exit plane 22 of the rod-like photoconductor 22 and an exit plane (upper surface) 36. The light is transmitted through the lower surface of the plate-like photoconductor 32.

Figure 3:
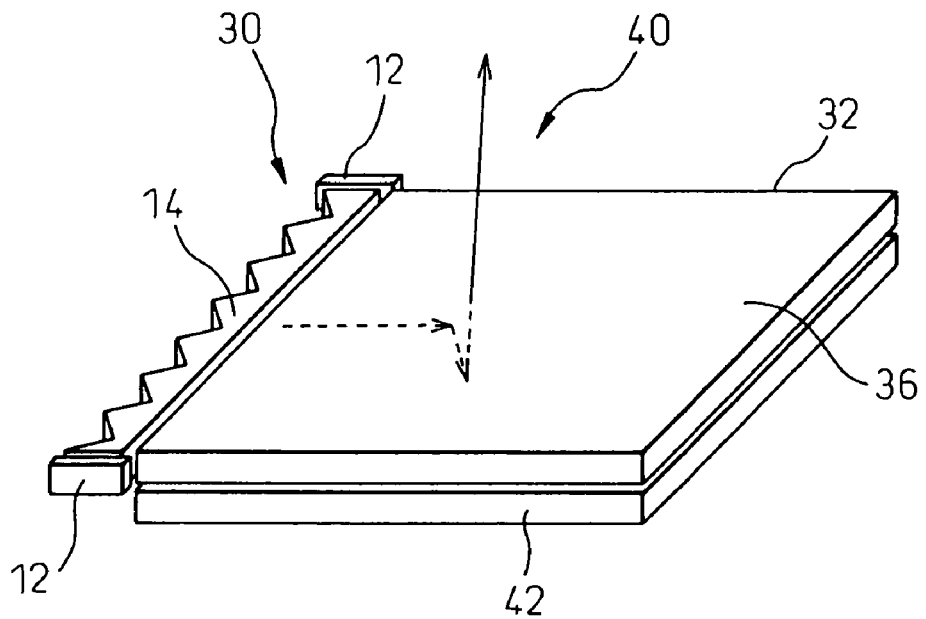
FIG. 3 is a diagram showing an example of a reflection-type liquid crystal display apparatus comprising an illuminating device.

FIG. 3 is a diagram showing an example of the reflection-type liquid crystal display apparatus including the illuminating device 30. The liquid crystal display apparatus 40 comprises the illuminating device 30 and a reflection-type liquid crystal panel 42. The illuminating device 30 includes the features of the functions shown in FIG. 2 and any modification thereof. The reflection-type liquid crystal panel 42 includes a pair of substrates between which liquid crystal is held. One of the substrates of the reflection-type liquid crystal panel 42 is formed with a reflection layer (a pixel electrode, for example, made of a reflective material). The reflection-type liquid crystal panel 42 can include a color filter and a polarizer. In FIG. 3, the reflection-type liquid crystal panel 42 is arranged under the plate-like photoconductor 32 of the illuminating device 30.

The light emitted from the light sources 12 enters the rod-like photoconductor 14 by way of the planes of incidence 16, and exits from the exit plane 22 through the rod-like photoconductor 14. The light that has left the exit plane 22 of the rod-like photoconductor 14 enters the plate-like photoconductor 32 by way of the plane of incidence 34, and through the plate-like photoconductor 32, leaves the exit plane 36. Specifically, as indicated by arrow in FIG. 3, the light, after entering the plate-like photoconductor 32, is reflected on the upper surface (same as the exit plane 36) and, and through the lower surface, proceeds toward the reflection-type liquid crystal panel 42. The light is transmitted through the liquid crystal, reflected on the reflection layer, transmitted again through the liquid crystal, and enters the plate-like photoconductor 32 by way of the lower surface thereof. Then, the light is passed through and exits from the plate-like photoconductor 32 by way of the exit plane 36.

Figure 4:
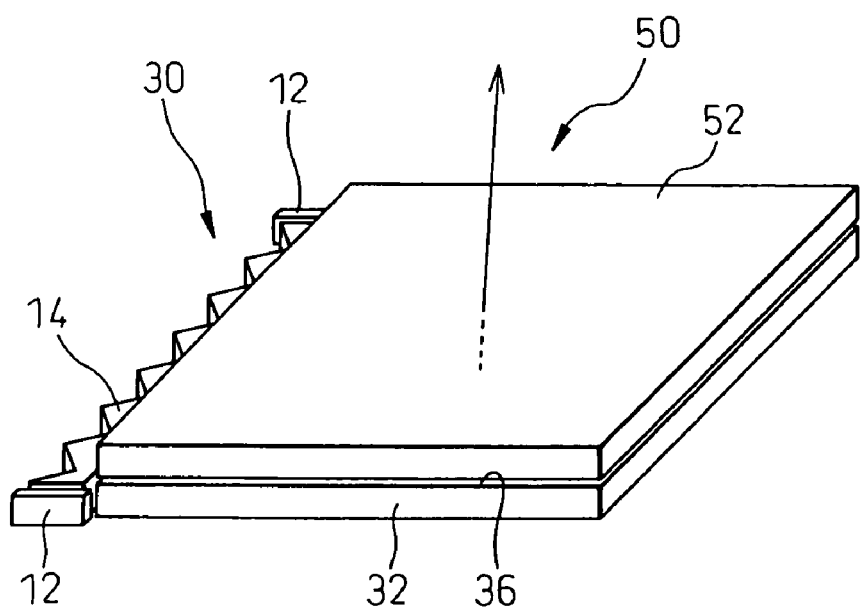
FIG. 4 is a diagram showing an example of a transmission-type liquid crystal display apparatus comprising an illuminating device.

FIG. 4 is a diagram showing an example of the transmission-type liquid crystal display apparatus including the illuminating device 30. The liquid crystal display apparatus 50 comprises the illuminating device 30 and a transmission-type liquid crystal panel 52. The illuminating device 30 has the features of the functions shown in FIG. 2 and any modification thereof. The transmission-type liquid crystal panel 52 includes a pair of substrates between which liquid crystal is held. The light is transmitted through the substrate pair. The transmission-type liquid crystal panel 52 may include a color filter and a polarizer. In FIG. 4, the transmission-type liquid crystal panel 52 is arranged above the plate-like photoconductor 32 of the illuminating device 30.

The light that has been emitted from the light sources 12 enters the planes of incidence 16 of the rod-like photoconductor 14, and through the rod-like photoconductor 14, exits from the exit plane 22. The light that has left the exit plane 22 of the rod-like photoconductor 14 enters the plane of incidence 34 of the plate-like photoconductor 32, and through the plate-like photoconductor 32, leaves it from the exit plane 36. The light that has left the exit plane 36 of the plate-like photoconductor 32 is transmitted through the transmission-type liquid crystal panel 52.

Figure 7:
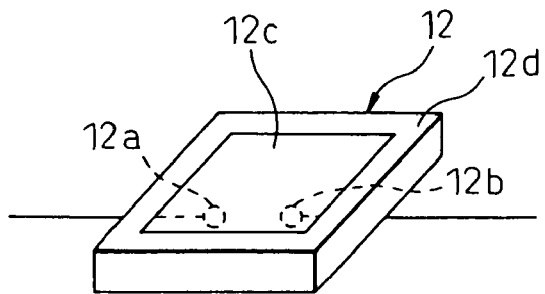
FIG. 7 is a perspective view showing a LED light source.

FIG. 7 is a perspective view showing a LED light source 12. The LED light source 12 includes a semiconductor carrying electrodes 12a, 12b, which semiconductor is covered with a transparent or translucent resin 12c and sealed into a package by a sealing resin 12d. The light generated by the electrodes 12a, 12b is scattered by the resin 12c and emitted outside. The resin 12c, therefore, constitutes a luminescent area of the LED light source 12. The width A of the LED light source 12 can be regarded as the width of the luminescent area.

Figure 9:
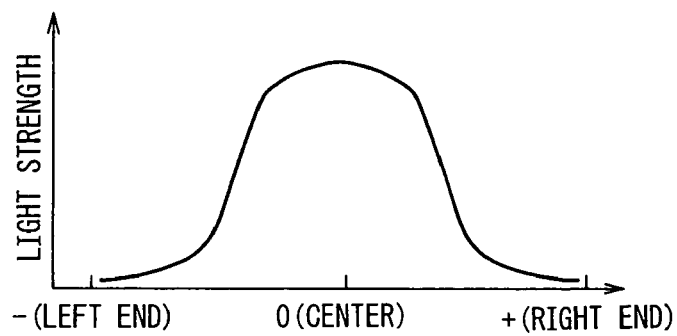
FIG. 9 is a diagram showing the light strength distribution of the illuminating device shown in FIG. 1.

FIG. 9 is a diagram showing the light strength distribution of the LED light source 12. The light strength of the LED light source 12 is high at the central portion and low at the end portions. Therefore, the light emitted from the central portion of each LED light source 12 can be used effectively, while the light emitted from the end portions of the LED light source 12 cannot be used efficiently.

Figure 5:
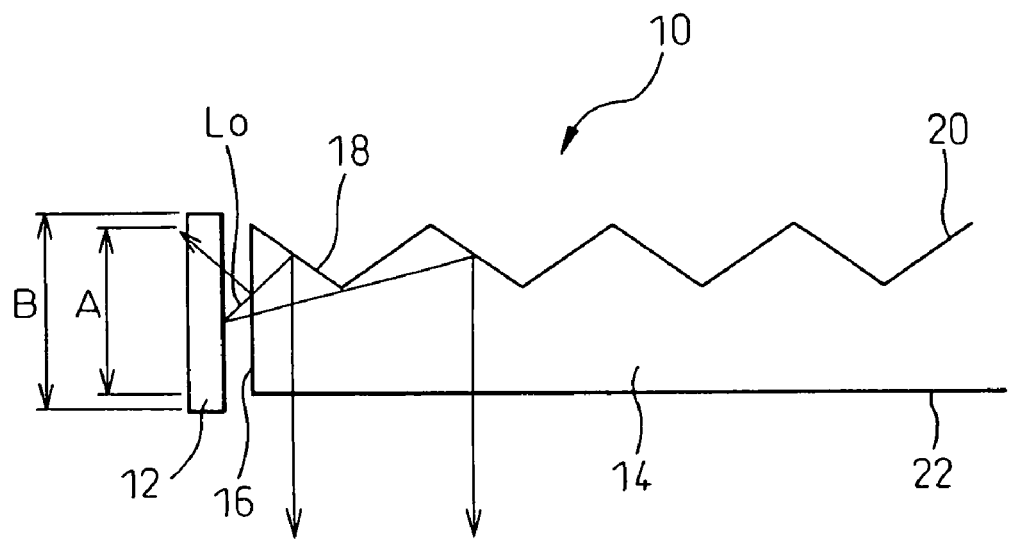
FIG. 5 is a diagram for explaining the features of the illuminating device shown in FIG. 1.

FIG. 5 is a diagram for explaining the features of the illuminating device 10 shown in FIG. 1. In FIGS. 1 and 5, as described above, the width A between the reflection surface 20 and the exit plane 22 at the plane of incidence 16 of the rod-like photoconductor 14 is smaller than the width B of each LED light source 12 in the same direction. Considering the light Lo entering the planes of incidence 16 of the rod-like photoconductor 14 from the LED light sources 12 and transmitting toward the prisms 18 in the neighborhood of the end portion of the rod-like photoconductor 14, the incidence angle of the light Lo at the plane of incidence 16 assumes a comparatively small first value.

Figure 6:
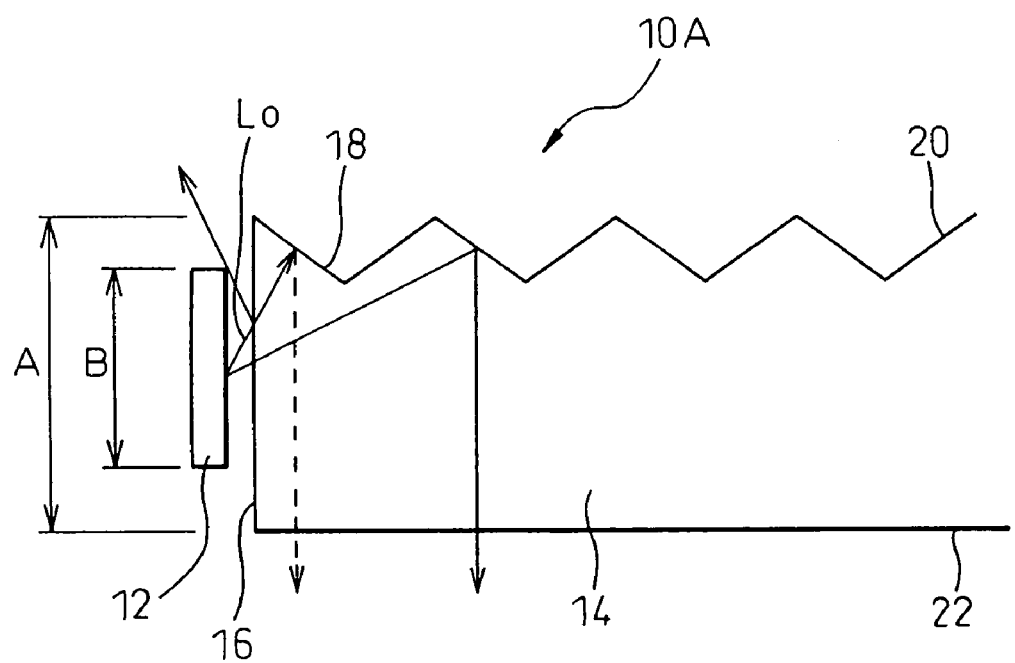
FIG. 6 is a diagram for explaining the features of the conventional illuminating device

FIG. 6 is a diagram for explaining the features of the conventional illuminating device 10A. For sake of convenience, the component elements corresponding to those shown in FIG. 5 are designated by the same reference numerals, respectively. In the conventional illuminating device 10A, the width A between the reflection surface 20 and the exit plane 22 at the plane of incidence 16 of the rod-like photoconductor 14 is larger than the width B of the corresponding LED light source in the same direction. Considering the light Lo entering the planes of incidence 16 of the rod-like photoconductor 14 from the LED light sources 12 and transmitting toward the prisms 18 in the neighborhood of the end portions of the rod-like photoconductor 14, the incidence angle of the light Lo at each plane of incidence 16 assumes a comparatively large second value.

Specifically, due to the relation between the width A of the rod-like photoconductor 14 and the width B of the light sources 12, the incidence angle (first value) of the light Lo at the planes of incidence 16 in FIG. 5 is smaller than the incidence angle (second value) of the light Lo at the planes of incidence 16 in FIG. 6 (the first value is smaller than the second value). The light entering the planes of incidence 16 is partly refracted before entering the rod-like photoconductor 14, while the other part of the light is reflected on the planes of incidence 16 and fails to enter the rod-like photoconductor 14. The smaller the incidence angle at the planes of incidence 16, the smaller the proportion of the light reflected on the planes of incidence 16, so that a greater amount of the light enters the rod-like photoconductor 14.

As described above, in FIG. 5, the light Lo that has entered the rod-like photoconductor 14 by way of the planes of incidence 16 is transmitted through the rod-like photoconductor 14, reflected on the surface of the prisms 18 in the neighborhood of the end portions of the rod-like photoconductor 14 and then exits from the exit plane 22. Similarly, in FIG. 6, the light Lo that has entered the rod-like photoconductor 14 by way of the planes of incidence 16 is transmitted through the rod-like photoconductor 14, reflected on the surface of the prisms 18 in the neighborhood of the end portions of the rod-like photoconductor 14 and exits from the exit plane 22. However, the amount of light exiting from the exit plane 22 is more for the former case than for the latter case.

Figure 8:
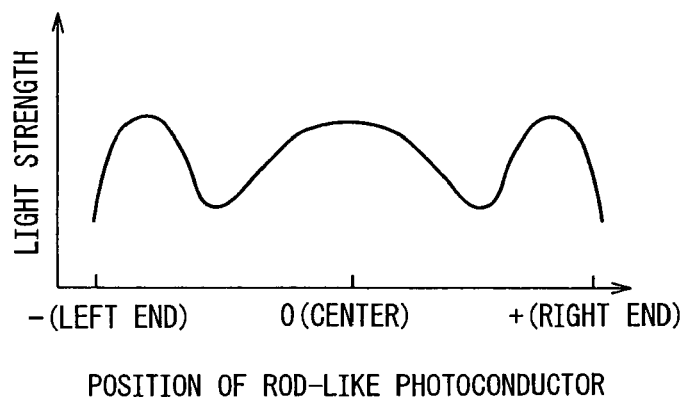
FIG. 8 is a diagram showing the light strength distribution of the LED light source.

FIG. 8 is a diagram showing the light strength distribution of the illuminating device 10 according to this invention. As explained with reference to FIGS. 5 and 6, according to this invention, the brightness of the exit light in the neighborhood of the end portions of the rod-like photoconductor 14 is increased. The brightness of the exit light at the central portion of the rod-like photoconductor 14 is of course high. As a result, the dark portion in the neighborhood of the end portions of the rod-like photoconductor 14 is eliminated.

In the prior art, the width A of the planes of incidence 16 of the rod-like photoconductor 14 is larger than the width B of the LED light sources 12 as shown in FIG. 6 in order to secure a margin against the displacement of the light sources 12 with respect to the rod-like photoconductor 14. Also, the width A of the planes of incidence 16 of the rod-like photoconductor 14 larger than the width B of the LED light sources 12 is conventionally considered advantageous for the apparent reason that the light emitted from the end portions of the luminescent area of the LED light sources 12 can also be introduced into the planes of incidence 16 of the rod-like photoconductor 14. As explained with reference to FIG. 9, however, the light emitted from the end portions of the luminescent area of the LED light source 12 is small in amount, and a large proportion of the light is emitted from the central portion of the LED light sources 12. It has been found, therefore, that the amount of the light entering the rod-like photoconductor 14 substantially remains unchanged even in the case where the width A of the planes of incidence 16 of the rod-like photoconductor 14 is smaller than the width B of the LED light sources 12 as in this invention.

The illuminating device 30 shown in FIG. 2 is affected by the light strength distribution of the illuminating device 10 shown in FIG. 1, and therefore the light strength distribution of the illuminating device 20 shown in FIG. 2 is improved by improving the light strength distribution of the illuminating device shown in FIG. 1. In similar fashion, the liquid crystal display apparatuses 40, 50 shown in FIGS. 3 and 4 are affected by the light strength distribution of the illuminating device 10 shown in FIG. 1, and therefore the light strength distribution of the liquid crystal display apparatuses 40, 50 shown in FIGS. 3 and 4 are also improved by improving the light strength distribution of the illuminating device 10 shown in FIG. 1.

The illuminating device 10 shown in FIG. 1 and the illuminating device 30 shown in FIG. 2 are used with the liquid crystal display apparatus having the screen size of one inch and the screen width of 17.5 mm. In this example, the length L of the rod-like photoconductor 14 is 18.5 mm, and the width A of the rod-like photoconductor 14 is 1.7 mm. The width B of the LED light sources 12 is 2 mm. The gap ΔL between the LED light sources 12 and the rod-like photoconductor 14 is substantially zero. The number of the prisms 18 is 122, the prism pitch is 0.15 mm and the apical angle θp of the prisms 18 is 105.5 degrees. The refractive index of the rod-like photoconductor 14 is 1.51.

Figure 10:
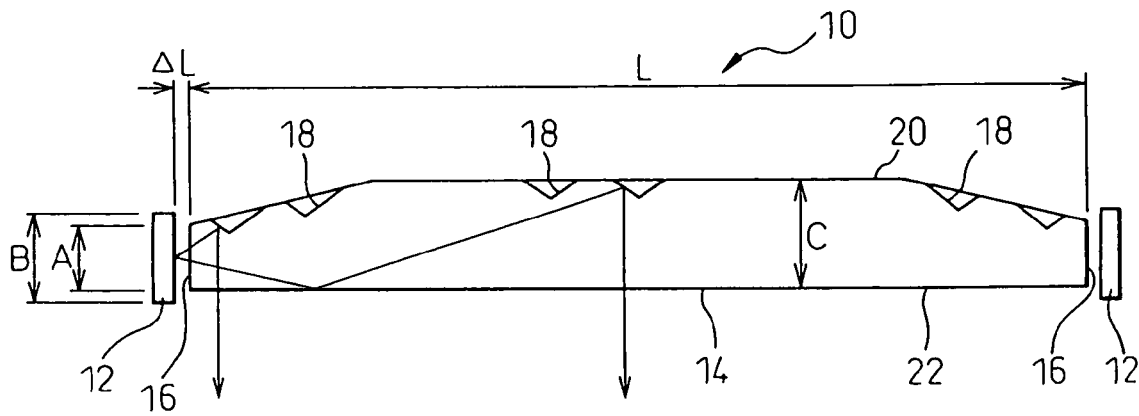
FIG. 10 is a diagram showing a modification of the illuminating device shown in FIG. 1.

FIG. 10 is a diagram showing a modification of the illuminating device 10 shown in FIG. 1. The illuminating device 10 shown in FIG. 10 is basically similar to the illuminating device 10 shown in FIG. 1. In FIG. 10, the width C between the reflection surface 20 and the exit plane 22 at the central portion of the rod-like photoconductor 14 is different from the width A between the reflection surface 20 and the exit plane 22 at the end portions of the rod-like photoconductor 14. The central portion of the reflection surface 20 of the rod-like photoconductor 14 extends in parallel to the exit plane 22, and the two sides of the central portion of the reflection surface 20 of the rod-like photoconductor 14 extend in taper and come to assume the width A at the planes of incidence 18 at the end portions of the rod-like photoconductor 14.

Figure 11:
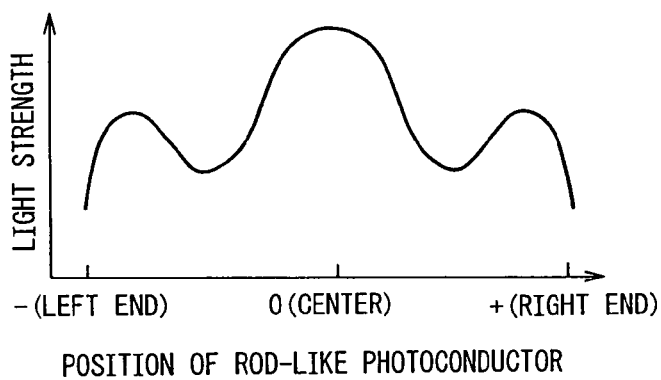
FIG. 11 is a diagram showing the relation between the thickness of the rod-like photoconductor and the brightness of the light transmitted through the rod-like photoconductor.

FIG. 11 is a diagram showing the relation between the thickness of the rod-like photoconductor 14 and the brightness of the light transmitted through the rod-like photoconductor 14. The brightness of the light passed through the rod-like photoconductor 14 has one peak at the portion of the rod-like photoconductor 14 where the width (thickness) thereof is large and another peak at the portion of the rod-like photoconductor 14 where the width (thickness) thereof is small.

Figure 12:
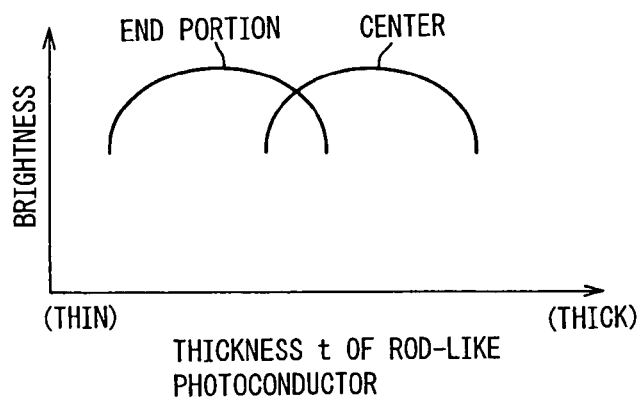
FIG. 12 is a diagram showing the light strength distribution of the illuminating device shown in FIG. 10.

FIG. 12 is a diagram showing the light strength distribution of the illuminating device shown in FIG. 10. The light strength is high both at the central portion of the rod-like photoconductor 14 where the width (thickness) thereof is large and at the end portions of the rod-like photoconductor 14 where the width (thickness) thereof is small. In this way, sufficient brightness is secured over the entire length of the rod-like photoconductor 14.

The illuminating device 10 shown in FIG. 10 and the illuminating device 30 shown in FIG. 2 are used with the liquid crystal display apparatus having the screen size of one inch and the screen width of 17.5 mm. In this case, the length L of the rod-like photoconductor 14 is 18.5 mm, and the width A at the planes of incidence 18 of the rod-like photoconductor 14 is 1.7 mm. The width C at the central portion of the rod-like photoconductor 14 is 3.0 mm. The width B of the LED light sources 12 is 2 mm. The gap ΔL between the LED light sources 12 and the rod-like photoconductor 14 is substantially zero. The number of the prisms 18 is 122, the prism pitch is 0.15 mm and the apical angle θp of the prisms 18 is 112.8 degrees. The refractive index of the rod-like photoconductor 14 is 1.51.

Figure 13:
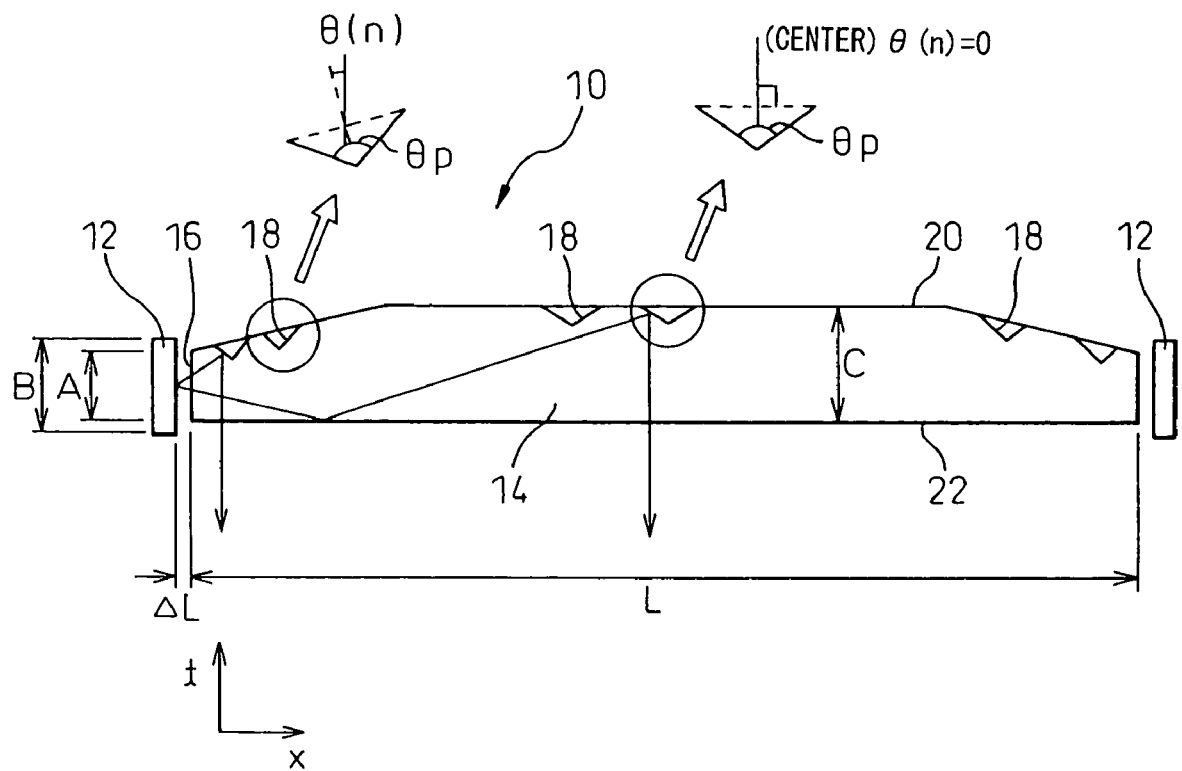
FIG. 13 is a diagram showing a modification of the illuminating device shown in FIG. 10.

FIG. 13 is a diagram showing a modification of the illuminating device 10 shown in FIG. 10. The illuminating device of FIG. 13 is basically similar to the illuminating device 10 of FIG. 10. In FIG. 13, the width C between the reflection surface 20 and the exit plane 22 at the central portion of the rod-like photoconductor 14 is different from the width A between the reflection surface 20 and the exit plane 22 at the end portions of the rod-like photoconductor 14. The central portion of the reflection surface 20 of the rod-like photoconductor 14 extends in parallel to the exit plane 22, and the two sides of the central portion of the reflection surface 20 of the rod-like photoconductor 14 extend in taper and come to assume the width A at the planes of incidence 18 at the end portions of the rod-like photoconductor 14. Further, the prisms 18 of the reflection surface 20 are formed to emit the light substantially at right angles to the exit plane 22. Preferably, the light is emitted from the exit plane 22 at an angular distribution of not more than ±3 degrees with respect to the normal to the exit plane 22. The prisms 18 is given by the relations described below.

The apical angle θp of the prisms 18 being constant, the inclination of the center line of each prism 18 with respect to the normal to the exit plane 22 is expressed as θ(n), where n is the number of a particular prism as counted from the planes of incidence 18. Let x be the direction taken from the planes of incidence 18 toward the opposite surface, and t be the direction taken from the exit plane 22 toward the reflection surface 20. X(n) indicates the position of the nth prism 18 along the x direction, and t(n) indicates the position of the nth prism 18 in the t direction. The inclination θ(n) of the prism 18 is obtained from the relation described below (this relation covers the portion from the planes of incidence 18 to the center of the rod-like photoconductor 14).

$$\theta_0 = \tan^{-1}((\Delta L + L/2)/(C + A/2))/2 \quad (1)$$

where n<40

$$\theta(n) = \theta_0 - (\tan^{-1}((\Delta L + X(n))/(t(n) - A/2))/2) \quad (2)$$

where n<61

$$\theta(n) = \theta_0 - (\tan^{-1}((\Delta L + X(n))/(t(n) + A/2))/2) \quad (3)$$

Figure 14:
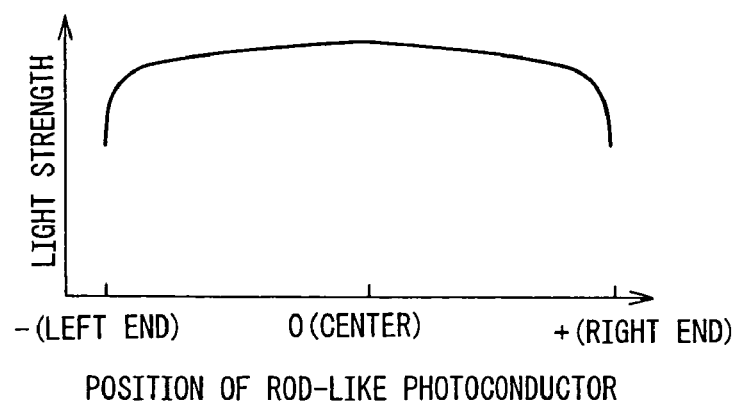
FIG. 14 is a diagram showing the light strength distribution of the illuminating device shown in FIG. 10.

FIG. 14 is a diagram showing the light strength distribution of the illuminating device shown in FIG. 13. As shown in FIG. 14, the light emitted from the LED light sources 12 exits at substantially right angles to the exit plane 22 of the rod-like photoconductor 14, thereby to secure a substantially constant light strength distribution.

In equation (2), the value θ(n) may increase to a physically impracticable degree. For example, the prisms Nos. 1 to 10, if physically impossible to fabricate, may of course be configured using X(n) and t(n) of the prism No. 11.

Figure 15:
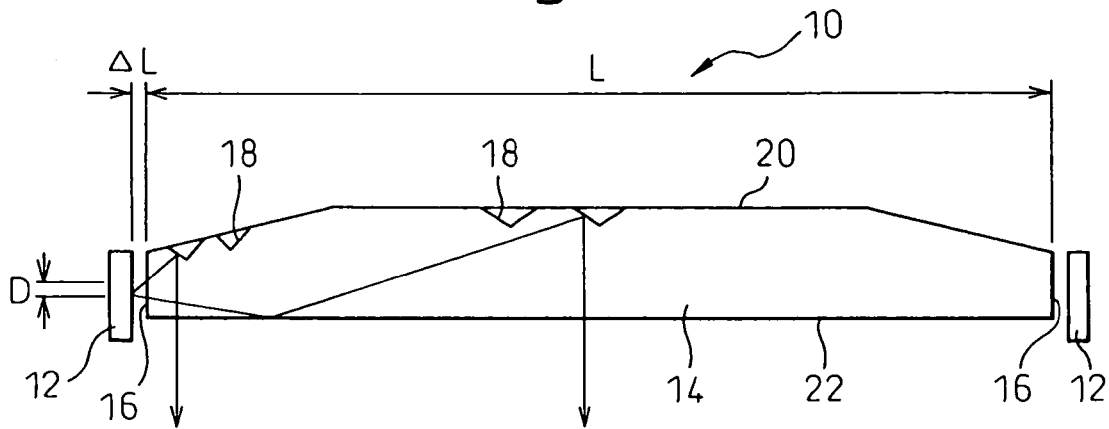
FIG. 15 is a diagram showing a modification of the illuminating device shown in FIG. 10.

FIG. 15 is a diagram showing a modification of the illuminating device 10 shown in FIG. 10. The illuminating device 10 of FIG. 15 is basically similar to the illuminating device 10 shown in FIG. 10. In FIG. 15, the center of each LED light source 12 is displaced by D from the center of the planes of incidence 18 toward the exit plane 22 of the rod-like photoconductor 14. This configuration can increase the brightness of the central portion of the rod-like photoconductor 14, thereby making it possible to brighten the whole surface. In the case where the center of the LED light sources 12 is moved toward the reflection surface 20 of the rod-like photoconductor 14, the end portions are brightened while the central portion is somewhat darkened. The direction of displacement, therefore, is of course preferably selected to the desire of the user.

Figure 16:
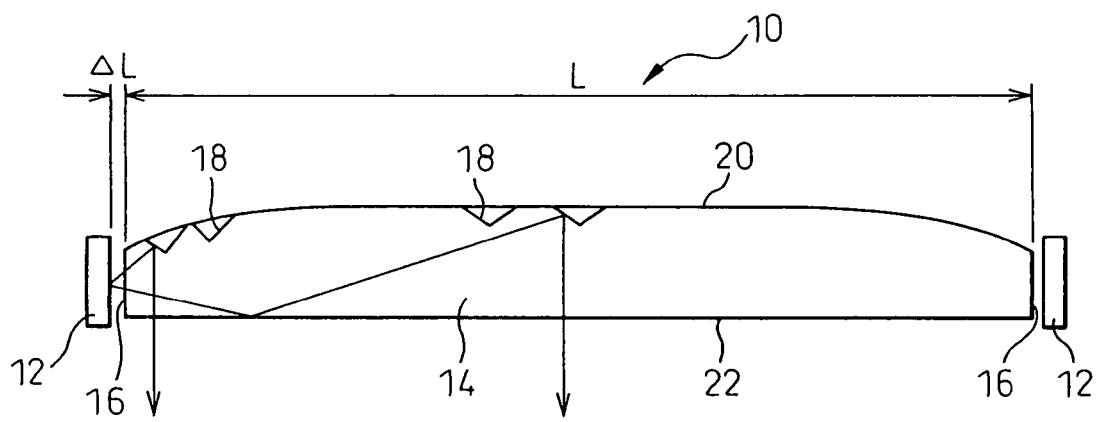
FIG. 16 is a diagram showing a modification of the illuminating device shown in FIG. 10.

FIG. 16 is a diagram showing a modification of the illuminating device 10 shown in FIG. 10. The illuminating device 10 of FIG. 16 is basically similar to the illuminating device 10 of FIG. 10. In FIG. 10, the reflection surface 20 of the rod-like photoconductor 14 is formed of a convex surface including a linear portion. In FIG. 16, on the other hand, the reflection surface 20 of the rod-like photoconductor 14 is formed of a gently curved convex surface. Even in the case where the reflection surface 20 of the rod-like photoconductor 14 is configured of a gently curved convex surface this way, a similar effect to that of the illuminating device 10 shown in FIG. 10 can be produced. In FIG. 10, the corners of the connecting portion of the two straight lines may represent itself in the display disadvantageously. Such an inconvenience, however, is eliminated by the gently curved configuration as in FIG. 16.

Figure 17:
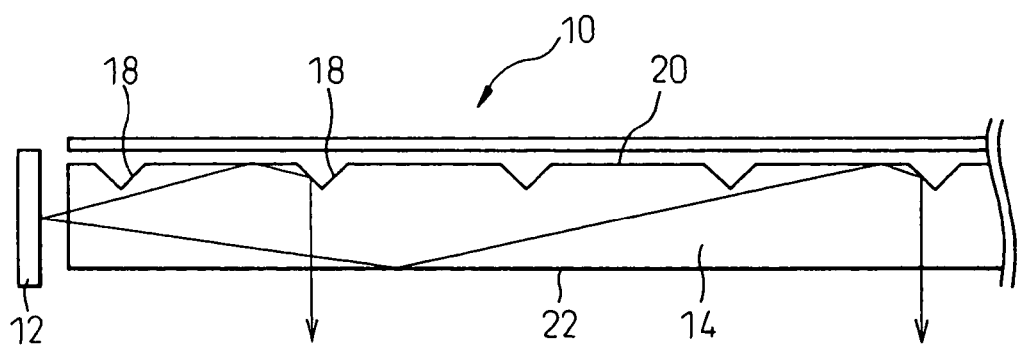
FIG. 17 is a diagram showing a modification of the illuminating device shown in FIG. 1.

FIG. 17 is a diagram showing a modification of the illuminating device 10 shown in FIG. 1. The illuminating device of FIG. 17 is basically similar to the illuminating device 10 of FIG. 10. In FIG. 17, the reflective coating is not applied to the reflection surface 20 of the rod-like photoconductor, but a reflective element such as an aluminum film is arranged in a holder. Even with the reflection surface 20 having no reflective coating, the light can be emitted at the desired angle from the center of the LED light sources 12. Nevertheless, a reflective film may be formed by evaporation or the like on the reflection surface 20.

As described above, according to the invention, the brightness at the end portions of a photoconductor is improved, and an illuminating device is provided which has an increased uniformity of light strength distribution. Also, by combining this illuminating device with a liquid crystal panel, a liquid crystal display apparatus with a uniform distribution in plane is realized.

The invention claimed is:

1. A display apparatus comprising:
a plate photoconductor;
a display panel adjacent to the plate photoconductor; and
an illuminating device,
wherein the illuminating device further comprises:
   a light source; and
   a rod photoconductor providing light to the plate photoconductor,
      wherein the rod photoconductor includes a plane of incidence entered by light from the light source, a reflection surface having a plurality of prisms and an exit plane located opposite to the reflection surface,
      wherein a width between the reflection surface and the exit plane at the plane of incidence of the rod photoconductor is smaller than a width of a light emission surface of the light source, the width between the reflection surface and the exit plane at the plane of incidence of the rod photoconductor being a width in a first direction from the reflection surface to the exit plane of the rod photoconductor, the width of the light emission surface of the light source being a width in the first direction, and
      wherein the reflection surface of the rod photoconductor is formed of a convex surface defined by a linear central portion between two linear tapered portions, such that an entire outer surface of the reflection surface is completely defined by the central portion and the tapered portions.

2. A display apparatus according to claim 1,
wherein a width between the reflection surface and the exit plane at a central portion of the rod photoconductor is larger than the width between the reflection surface and the exit plane at an end portion of the rod photoconductor.

3. A display apparatus according to claim 1,
wherein the plurality of prisms on the reflection surface of the rod photoconductor are formed in such a manner as to emit the light from the exit plane substantially at right angles thereto.

4. A display apparatus according to claim 1,
wherein the center of the light source is displaced from the center of a corresponding plane of incidence of the rod photoconductor.

5. A display apparatus according to claim 4,
wherein the light source is displaced toward the exit plane of said rod photoconductor from the center of the corresponding plane of incidence of the rod photoconductor.

6. A display apparatus according to claim 1, wherein the reflection surface includes a reflection means.

7. A display apparatus according to claim 6, wherein the reflection means is integrally configured.

8. A display apparatus comprising:
a plate photoconductor;
a display panel adjacent to the plate photoconductor; and
an illuminating device,
wherein the illuminating device further comprises:
   a light source; and
   a rod photoconductor providing light to the plate photoconductor;
      wherein the rod photoconductor includes a plane of incidence entered by light from the light source, a reflection surface having a plurality of prisms and an exit plane located opposite to the reflection surface,
      wherein the plate photoconductor includes a plane of incidence entered by the light from the exit plane of the rod photoconductor and another exit plane,
      wherein a width between the reflection surface and the exit plane at the plane of incidence of the rod photoconductor is smaller than a width of a light emission surface of the light source, the width between the reflection surface and the exit plane at the plane of incidence of the rod photoconductor being a width in a first direction from the reflection surface to the exit plane of the rod photoconductor, the width of the light emission surface of the light source being a width in the first direction, and
      wherein the reflection surface of the rod photoconductor is formed of a convex surface defined by a linear central portion between two linear tapered portions, such that an entire outer surface of the reflection surface is completely defined by the central portion and the tapered portions.

9. A display apparatus according to claim 8,
wherein a width between the reflection surface and the exit plane at a central portion of the rod photoconductor is larger than the width between the reflection surface and the exit plane at an end portion of the rod photoconductor.

10. A display apparatus according to claim 8,
wherein the plurality of prisms on the reflection surface of the rod photoconductor are formed in such a manner as to emit the light from the exit plane substantially at right angles thereto.

11. A display apparatus according to claim 8,
wherein the center of the light source is displaced from the center of a corresponding plane of incidence of the rod photoconductor.

12. A display apparatus according to claim 11,
wherein the light sources is displaced toward the exit plane of said rod photoconductor from the center of the corresponding plane of incidence of the rod photoconductor.

13. A display apparatus according to claim 8,
wherein the reflection surface includes a reflection means.

14. A display apparatus according to claim 13, wherein the reflection means is integrally configured.

15. A display apparatus comprising:
a plate photoconductor;
a display panel adjacent to the plate photoconductor; and
an illuminating device,
wherein the illuminating device further comprises:
   a light emitting diode (LED) light source; and
   a rod photoconductor providing light to the plate photoconductor,
      wherein the rod photoconductor includes a plane of incidence entered by light from the light source, a reflection surface having a plurality of prisms and an exit plane located opposite to the reflection surface, and
      wherein a width between the reflection surface and the exit plane at the plane of incidence of the rod photoconductor is smaller than a width of a light emission surface of the light source, the width between the reflection surface and the exit plane at the plane of incidence of the rod photoconductor being a width in a first direction from the reflection surface to the exit plane of the rod photoconductor, the width of the light emission surface of the light source being a width in the first direction, and wherein the reflection surface of the rod photoconductor is formed of a convex surface defined by a linear central portion between two linear tapered portions, such that an entire outer surface of the reflection surface is completely defined by the central portion and the tapered portions.

16. A display apparatus according to claim 15, wherein a width between the reflection surface and the exit plane at a central portion of the rod photoconductor is larger than the width between the reflection surface and the exit plane at an end portion of the rod photoconductor.

17. A display apparatus according to claim 15, wherein the plurality of prisms on the reflection surface of the rod photoconductor are formed in such a manner as to emit the light from the exit plane substantially at right angles thereto.

18. A display apparatus according to claim 15, wherein the center of the light source is displaced from the center of a corresponding plane of incidence of the rod photoconductor.

19. A display apparatus according to claim 18, wherein the light source is displaced toward the exit plane of said rod photoconductor from the center of the corresponding plane of incidence of the rod photoconductor.

20. A display apparatus according to claim 15, wherein the reflection surface includes a reflection means.

21. A display apparatus according to claim 20, wherein the reflection means is integrally configured.

22. A display apparatus comprising according to claim 1, wherein the display panel is a liquid crystal display panel.

23. A display apparatus according to claim 8, wherein the display panel is a liquid crystal display panel.

24. A display apparatus according to claim 15, wherein the display panel is a liquid crystal panel.

* * * * *